US009896871B2

(12) United States Patent
Ungetheim et al.

(10) Patent No.: US 9,896,871 B2
(45) Date of Patent: Feb. 20, 2018

(54) METHOD OF EXTENDING OPENING RANGES OF VEHICLE SLIDING DOORS

(71) Applicant: VANTAGE MOBILITY INTERNATIONAL, LLC, Phoenix, AZ (US)

(72) Inventors: Steven P. Ungetheim, Phoenix, AZ (US); Michael L. Perez, Phoenix, AZ (US)

(73) Assignee: Vantage Mobility International, LLC, Phoenix, AZ (US)

( * ) Notice: Subject to any disclaimer, the term of this patent is extended or adjusted under 35 U.S.C. 154(b) by 0 days.

(21) Appl. No.: 15/432,036

(22) Filed: Feb. 14, 2017

(65) Prior Publication Data
US 2017/0234048 A1 Aug. 17, 2017

Related U.S. Application Data

(60) Provisional application No. 62/295,847, filed on Feb. 16, 2016.

(51) Int. Cl.
*E05D 15/06* (2006.01)
*B23P 6/00* (2006.01)
(Continued)

(52) U.S. Cl.
CPC ......... *E05D 15/0604* (2013.01); *A61G 3/061* (2013.01); *B23P 6/00* (2013.01); *E05D 3/18* (2013.01); *E05D 5/0207* (2013.01); *E05D 15/14* (2013.01); *E05D 15/30* (2013.01); *E05Y 2900/531* (2013.01); *Y10T 29/4973* (2015.01); *Y10T 29/49716* (2015.01)

(58) Field of Classification Search
CPC .. Y10T 29/49716; Y10T 29/4973; B23P 6/00; E05D 15/0604; E05D 5/0207; E05D 15/30; E05D 15/14; E05Y 2900/531
See application file for complete search history.

(56) References Cited

U.S. PATENT DOCUMENTS 6,036,257 A 3/2000 Manuel
6,158,173 A 12/2000 Goodrich et al.
(Continued)

FOREIGN PATENT DOCUMENTS

EP 2826648 A1 1/2015

OTHER PUBLICATIONS

PCT International Search Report and Written Opinion, dated May 8, 2017, International Application No. PCT/US2017/017912, 8 pages.

*Primary Examiner* — Jermie Cozart
(74) *Attorney, Agent, or Firm* — Fennemore Craig, P.C.

(57) ABSTRACT

An extended range sliding door hinge may include a track bracket assembly and an intermediate bracket. The track bracket assembly is sized to be operatively received by a vehicle door track assembly. A first end of the intermediate bracket is movably mounted to the track bracket assembly so that the intermediate bracket may be moved with respect to the track bracket assembly between a retracted position and an extended position. A second end of the intermediate bracket is sized to operatively engage a vehicle sliding door. The extended range sliding door hinge allows the vehicle sliding door to be moved between a standard position when the intermediate bracket is in the retracted position and an extended position when the intermediate bracket is in the extended position.

4 Claims, 10 Drawing Sheets

(51) Int. Cl.
*A61G 3/06* (2006.01)
*E05D 3/18* (2006.01)
*E05D 5/02* (2006.01)
*E05D 15/14* (2006.01)
*E05D 15/30* (2006.01)

(56) References Cited

U.S. PATENT DOCUMENTS

| | | |
|---|---|---|
| 7,731,270 B2 | 6/2010 | Fischer et al. |
| 2009/0230721 A1 | 9/2009 | Rusnak |
| 2009/0230722 A1 | 9/2009 | Krajenke et al. |
| 2014/0157550 A1 | 6/2014 | Yun et al. |

METHOD OF EXTENDING OPENING RANGES OF VEHICLE SLIDING DOORS

CROSS-REFERENCE TO RELATED APPLICATION

This application claims the benefit of U.S. Provisional Patent Application No. 62/295,847, filed on Feb. 16, 2016, which is hereby incorporated herein by reference for all that it discloses.

TECHNICAL FIELD

The present invention relates to sliding door systems in general and more specifically to methods and systems of extending the range of motion of sliding doors on motor vehicles.

BACKGROUND

Ramp systems for vehicles are known in the art and are commonly provided as modifications to OEM vehicles, such as minivans. The ramp systems allow persons requiring wheelchairs to readily enter such vehicles, either to drive the vehicles themselves or to ride along. Such ramp systems may be manually operated or may be power-deployable. On such conversion vehicles, it is common for the second row sliding door to not open wide enough for a wheelchair user to pass through the opening. While certain systems have been developed to allow the vehicle sliding doors to open wider, newer vehicles having newer body and sliding door designs pose additional challenges in modifying the sliding doors so that they open wide enough to allow good access to the vehicle interior.

SUMMARY OF THE INVENTION

One embodiment of an extended range sliding door hinge includes a track bracket assembly and an intermediate bracket. The track bracket assembly is sized to be operatively received by a vehicle door track assembly. A first end of the intermediate bracket is movably mounted to the track bracket assembly so that the intermediate bracket may be moved with respect to the track bracket assembly between a retracted position and an extended position. A second end of the intermediate bracket is sized to operatively engage a vehicle sliding door. The extended range sliding door hinge allows the vehicle sliding door to be moved between a standard position when the intermediate bracket is in the retracted position and an extended position when the intermediate bracket is in the extended position.

Also disclosed is a method of increasing a width of an opening created in a vehicle by moving a sliding door from a closed position to an opened position that involves: Removing the sliding door from the vehicle; removing at least one existing sliding door hinge from the sliding door and from a vehicle door track assembly provided on the vehicle; providing an extended range sliding door hinge having a track bracket assembly sized to be operatively received by the vehicle door track assembly and an intermediate bracket having a first end and a second end, the first end of the intermediate bracket being movably mounted to the track bracket assembly so that the intermediate bracket may be moved with respect to the track bracket assembly between a retracted position and an extended position, the second end of the intermediate bracket being sized to operatively engage the sliding door; and reinstalling the sliding door on the vehicle by engaging the extended range sliding door hinge with the vehicle door track assembly and the sliding door, the extended range sliding door hinge allowing the sliding door to be moved between a standard position when the intermediate bracket of the extended range sliding door hinge is in the retracted position and an extended position when the intermediate bracket of the extended range sliding door hinge is in the extended position.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
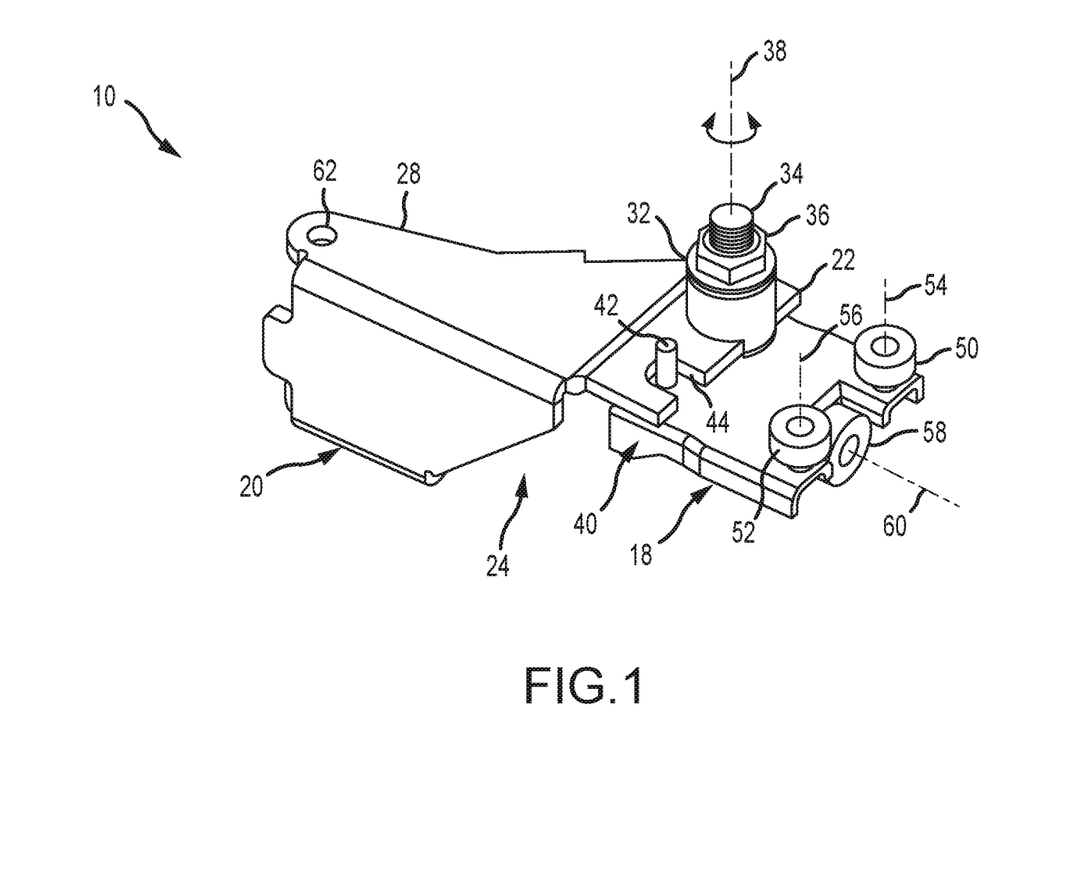
FIG. 1 is a perspective top view of an extended range sliding door hinge according to a first embodiment of the present invention with the hinge shown in a retracted position.
Figure 2:
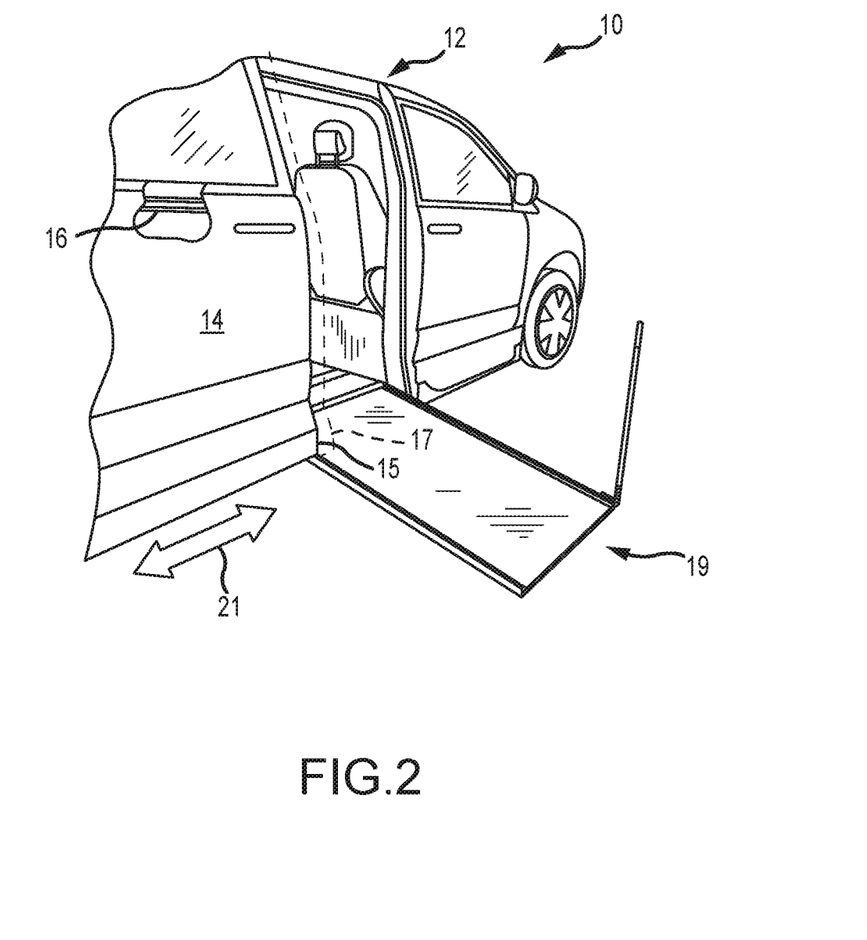
FIG. 2 is a perspective side view of a vehicle having a wheelchair ramp system, the perspective view showing the extended opened position of the door assembly made possible by the extended range sliding door hinge.
Figure 3:
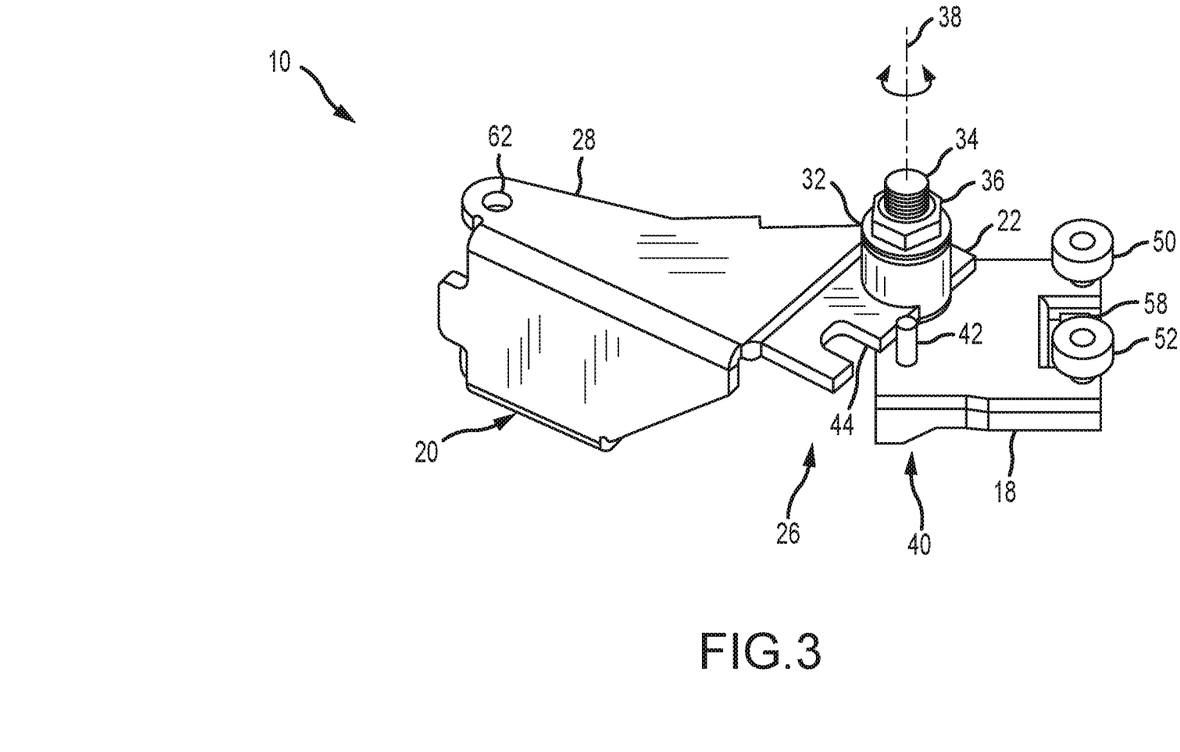
FIG. 3 is a perspective top view of the extended range sliding door hinge of FIG. 1 with the hinge shown in an extended position.

One embodiment of an extended range sliding door hinge 10 is illustrated in FIGS. 1-3 as it could be used in conjunction with a passenger vehicle 12 to allow a sliding door assembly 14 thereof to open further than otherwise would be the case if the door assembly 14 were not provided with the extended range sliding door hinge 10. More specifically, and as illustrated in FIG. 2, when substituted for an existing or OEM sliding door hinge (not shown), the extended range sliding door hinge 10 allows the vehicle door assembly 14 to be opened to an extended position 15 that is wider than a standard position 17 possible with the standard or unmodified door mounting arrangement. The wider opening provided by the extended range sliding door hinge 10 may be advantageous in any of a wide range of circumstances, including for example, in applications wherein the vehicle 12 is provided with a ramp system 19 to accommodate wheelchair use.

In a typical configuration, the sliding door assembly 14 is mounted to vehicle 12 by means of three separate door tracks or door track assemblies, referred to herein as a lower track (not shown), a center or intermediate track 16, and an upper track (also not shown). The lower, center, and upper door tracks allow the door assembly 14 to move or slide generally longitudinally, i.e., in the fore and aft directions indicated by arrows 21, between opened and closed positions, as is well known. However, if the vehicle 12 is to be provided with a wheelchair ramp system 19, it is usually desirable, and in many cases, required, to modify the sliding door assembly 14 so that it will open sufficiently wide to allow good access via the wheelchair ramp system 19. While the upper and lower tracks of most such vehicles 12 may be lengthened or extended to provide the additional opening range for the door 14, the body and door design of many vehicles 12, and in particular newer vehicles, is such that the center or intermediate door track 16 cannot be easily lengthened or extended, thereby making it difficult to modify the door assembly 14 to provide a wider opening. The extended range sliding door hinge 10 of the present invention allows the door assembly 14 to provide a wider opening but without the need to extend or otherwise modify the center track 16.

Having briefly described one embodiment of the extended range sliding door hinge 10 of the present invention, as well as some of its more significant features and advantages, various embodiments and alternative configurations of the present invention will now be described in detail. However, before proceeding with the description, it should be noted that while various embodiments are shown and described herein as they could be used in conjunction with a passenger vehicle modified to include a ramp system 19 to accommodate wheelchair use, the devices and methods of the present invention could also be used in conjunction with any of a wide range of vehicles configured for use in a wide range of applications. Consequently, the present invention should not be regarded as limited to the particular types of vehicles, applications, and circumstances shown and described herein.

Referring now to FIGS. 1-4, one embodiment of the extended range sliding door hinge 10 may comprise a sliding or track bracket assembly 18 and an intermediate bracket 20. The sliding or track bracket assembly 18 may be configured and sized to be received by the center or intermediate door track assembly 16 provided on the vehicle 12. See also FIG. 8. In one embodiment, the track bracket assembly 18 may comprise first and second guide wheels or rollers 50 and 52 mounted so that they are free to rotate about respective first and second axes 54 and 56, as best seen in FIGS. 1 and 3. A third guide wheel or roller 58 may be mounted to the track bracket assembly 18 so that third guide wheel 58 is free to rotate about a third axis 60. In many embodiments, the third axis 60 will be generally perpendicular to the first and second axes 54 and 56, although the arrangement and orientation of the various wheels 50, 52, and 58 will depend primarily on the particular configuration of the vehicle door track 16 that is to receive the track bracket assembly 18. The first, second, and third guide wheels 50, 52, and 58 allow the track bracket assembly 18 to engage with and roll along the middle door track assembly 16.

In this regard it should be noted that while some embodiments of the sliding or track bracket assembly 18 may be provided with a plurality of wheels or rollers 50, 52, and 58, as shown and described herein, other embodiments of the track bracket assembly instead may be provided with one or more sliding bearings (not shown). In such embodiments, the track bracket assembly will slide rather than roll on the door track assembly 16. Accordingly, the terms 'sliding' or 'rolling' as used herein with respect to the engagement of the track bracket assembly 18 with the door track assembly 16 should be regarded as encompassing both rolling and sliding engagement.

Track bracket assembly 18 may be fabricated from any of a wide range of materials, such as metals, plastics, or composite materials, that are now known in the art or that might be developed in the future that are, or would be, suitable for the particular application. Consequently, the track bracket 18 should not be regarded as limited to any particular material. However, by way of example, in one embodiment, track bracket 18 is fabricated from mild steel.

Figure 5:
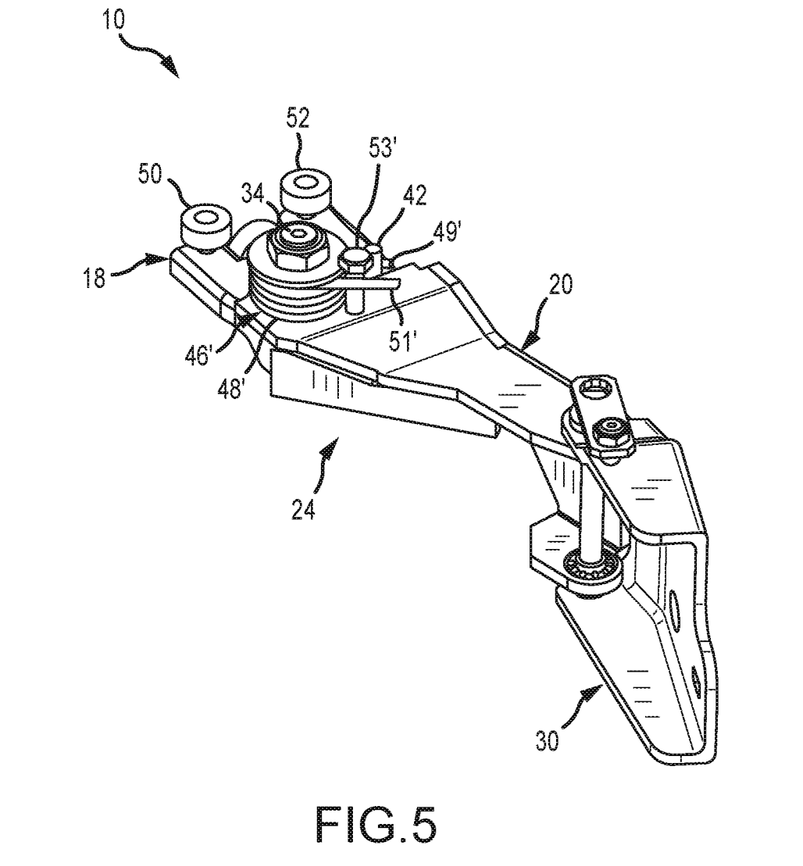
FIG. 5 is a perspective top view of an extended range sliding door hinge wherein the biasing member is a torsion spring.
Figure 6:
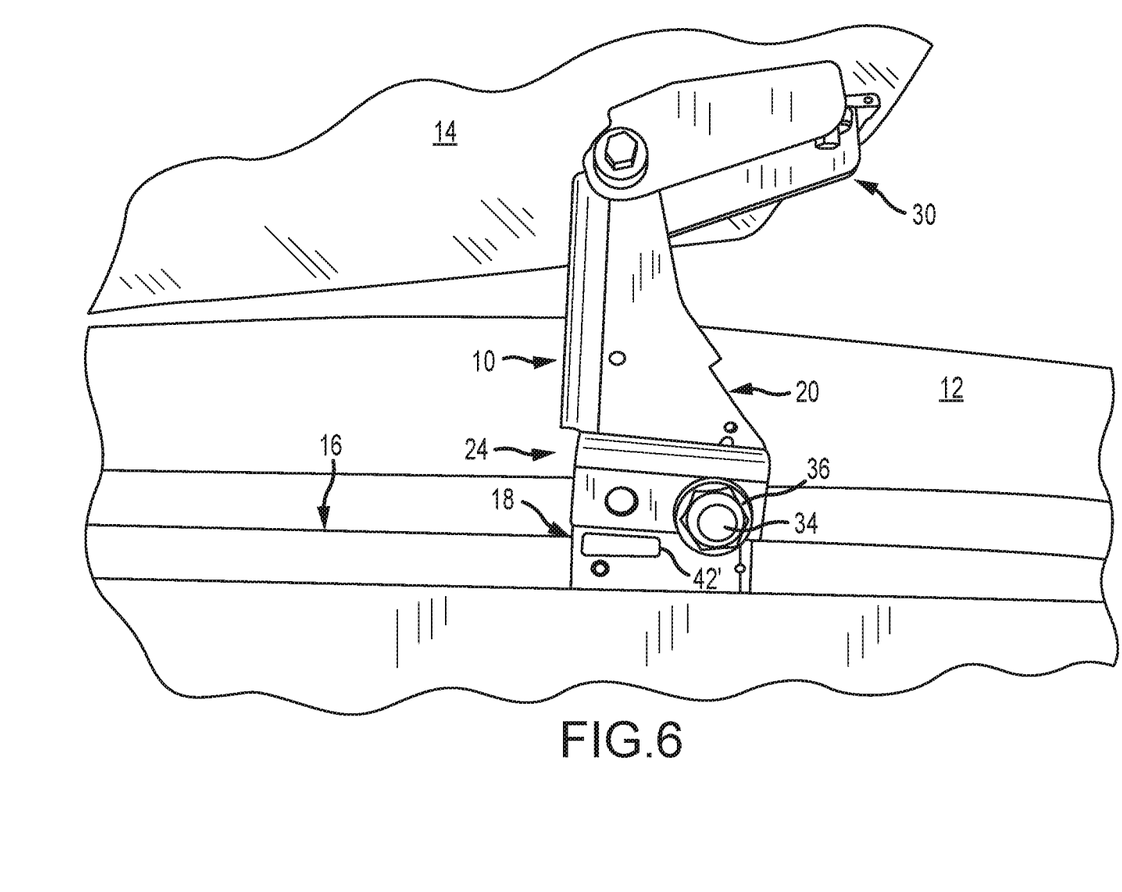
FIG. 6 is a top view of the extended range sliding door hinge mounted to a center door track of the vehicle with the door in the partially opened position.
Figure 7:
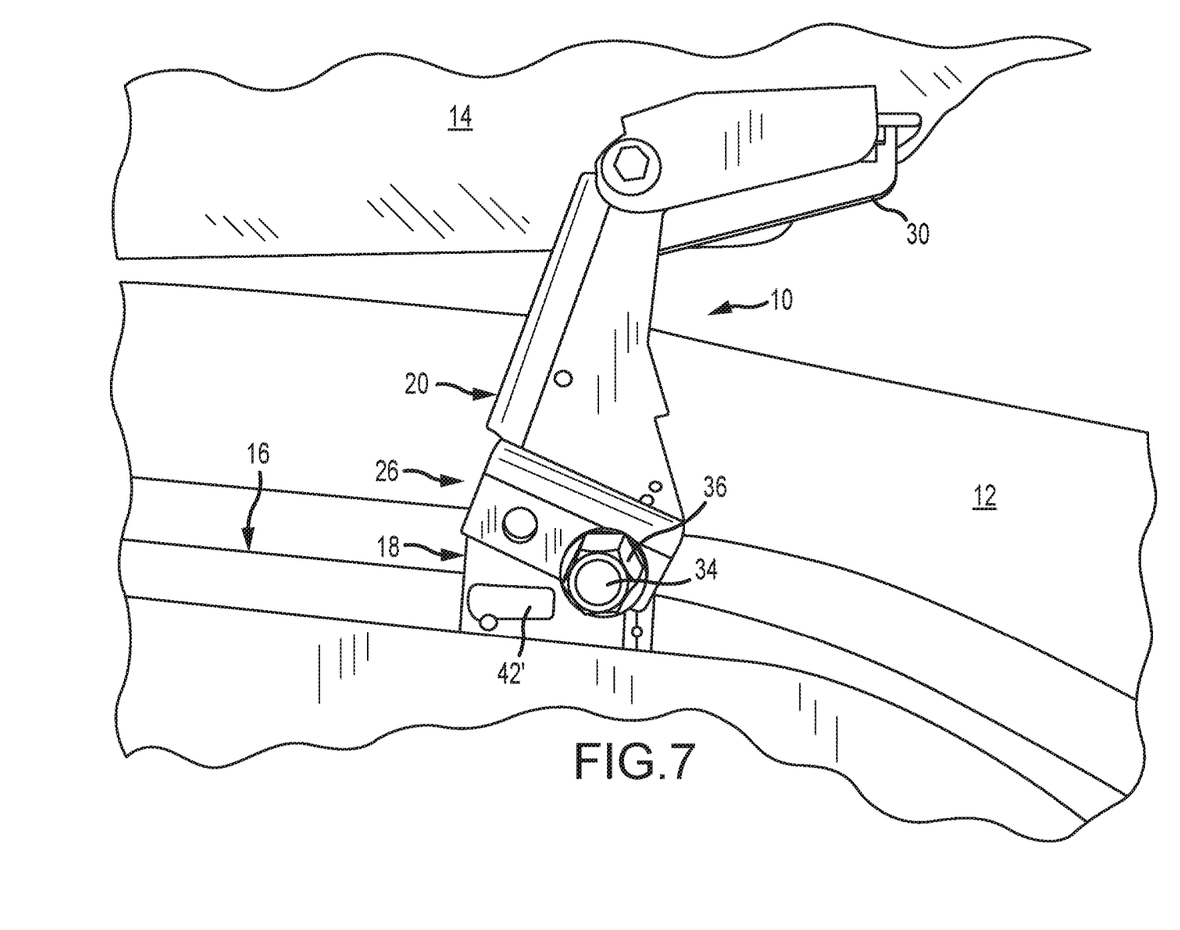
FIG. 7 is a top view of the extended range sliding door hinge illustrated in FIG. 6 with the door in the fully opened position and with the extended range sliding door hinge in the extended position.

With reference now primarily to FIGS. 1 and 3, the intermediate bracket 20 of extended range sliding door hinge 10 may comprise a first end 22 and a second end 28. The first end 22 of the intermediate bracket 20 is moveably mounted to the track bracket assembly 18 so that the intermediate bracket 20 may be moved with respect to the track bracket assembly 18 between a retracted position 24, illustrated in FIG. 1, and an extended position 26, illustrated in FIG. 3. The second end 28 of intermediate bracket 20 may be configured to engage with or mount to the sliding door assembly 14 of vehicle 12. In many embodiments, the sliding door assembly 14 will be provided with a separate door bracket 30 (FIGS. 5-7) that is designed or configured to be pivotally mounted to the OEM door hinge (not shown) to be replaced by the extended range sliding door hinge 10. If so, the second end 28 of intermediate bracket 20 may be provided with a pair of holes 62, 64, therein to allow the second end 28 of intermediate bracket 20 to be pivotally mounted to door bracket 30, as best seen in FIGS. 5-7. Of course other mounting arrangements are possible and may depend in large measure on the particular mounting arrangement of the sliding door assembly 14. Consequently, the present invention should not be regarded as limited to any particular arrangement or configuration for mounting the intermediate bracket 20 to the vehicle door assembly 14 and/or separate door bracket 30.

As was the case for the track bracket assembly 18, intermediate bracket 20 may be fabricated from any of a wide range of materials, such as metals, plastics, or composite materials suitable for the intended application. Therefore, the present invention should not be regarded as limited to any particular material. However, by way of example, in one embodiment, intermediate bracket 20 is fabricated from mild steel.

As mentioned earlier, the intermediate bracket 20 is moveably mounted to the track bracket assembly 18 so that the intermediate bracket may be moved between a retracted position 24 (e.g., illustrated in FIGS. 1 and 5) and an extended position 26 (e.g., illustrated in FIG. 3). In one embodiment 10, the intermediate bracket 20 is pivotally mounted to the track bracket assembly 18, although other arrangements are possible, some of which are described herein. In an embodiment wherein the intermediate bracket 20 is pivotally mounted to track bracket assembly 18, the first end 22 of intermediate bracket 20 may be provided with a bushing 32 thereon that is sized to receive a pivot bolt 34 and nut 36 provided on the track bracket assembly 18. The mounting arrangement allows the intermediate bracket 20 to pivot about axis 38 between the retracted and extended positions 24 and 26, illustrated in FIGS. 1 and 3, respectively.

In some embodiments, the extended range sliding door hinge 10 may also be provided with a travel stop 40. Travel stop 40 prevents the intermediate bracket 20 from being retracted beyond the retracted position 24. In one embodiment, travel stop 40 may comprise a pin 42 mounted to track bracket assembly 18. In the embodiment illustrated in FIGS. 1-4, intermediate bracket 20 may be provided with a slot 44 sized to receive pin 42 when the intermediate bracket 20 is in the fully retracted position 24, as best seen in FIG. 1. Alternatively, such a slot is not required, as depicted in the configuration shown in FIG. 5. Still yet other arrangements are possible. For example, in the configuration illustrated in FIGS. 6-8, travel stop 40 may comprise a flange 42' provided on track bracket assembly 18. Flange 42' may be positioned on track bracket assembly 18 so that it abuts the intermediate bracket 20 when the same is in the retracted position 24.

Figure 4:
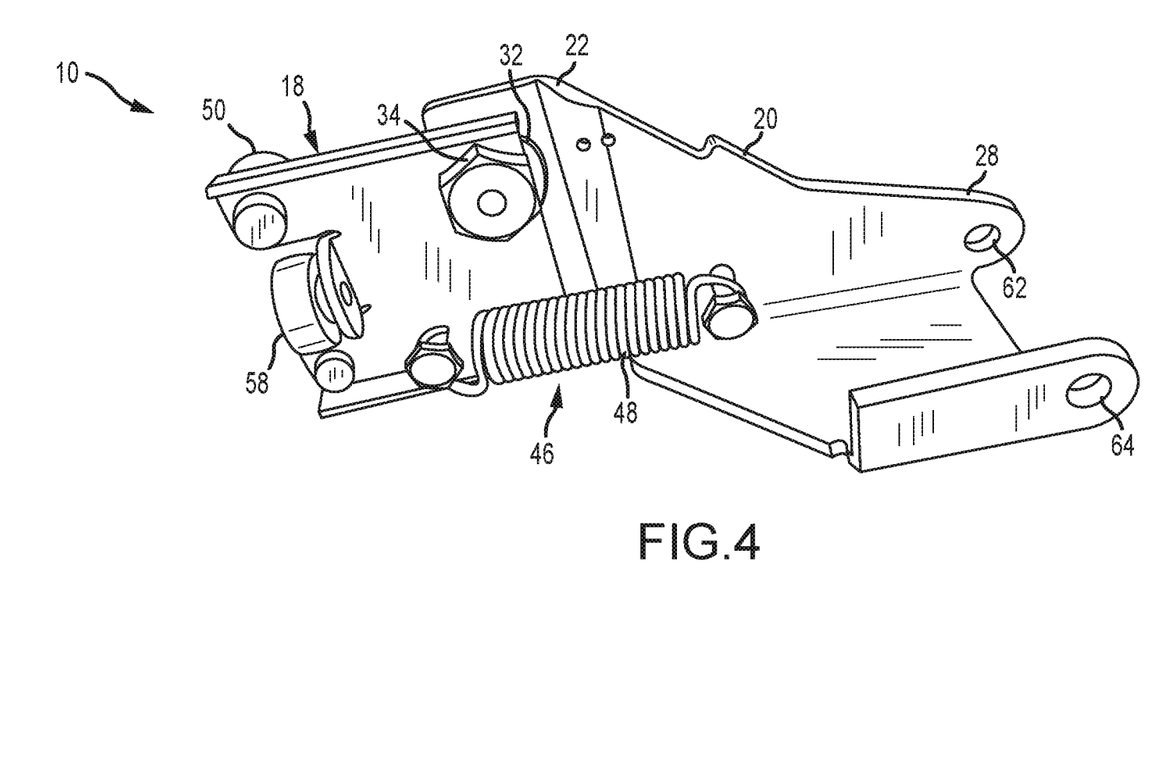
FIG. 4 is a perspective bottom view of the extended range sliding door hinge of FIGS. 1 and 3 wherein the biasing member is a coil spring.

The extended range sliding door hinge 10 also may be provided with a biasing member 46, as best seen in FIGS. 4 and 5. Biasing member 46 biases the intermediate bracket 20 in the fully retracted position 24. In the configuration illustrated in FIG. 4, biasing member 46 may comprise a coil spring 48 mounted between the track bracket assembly 18 and intermediate bracket 20. Other arrangements are possible. For example, an alternative biasing member 46' illustrated in FIG. 5 may comprise a torsion spring 48' mounted around pivot bolt 34. A first tang end 49' of torsion spring 48' may engage pin 42 provided on track bracket assembly 18. A second tang end 51' may engage a bolt 53' provided on intermediate bracket 20. Torsion spring 48' therefore biases the intermediate bracket 20 in the fully retracted position 24.

Figure 8:
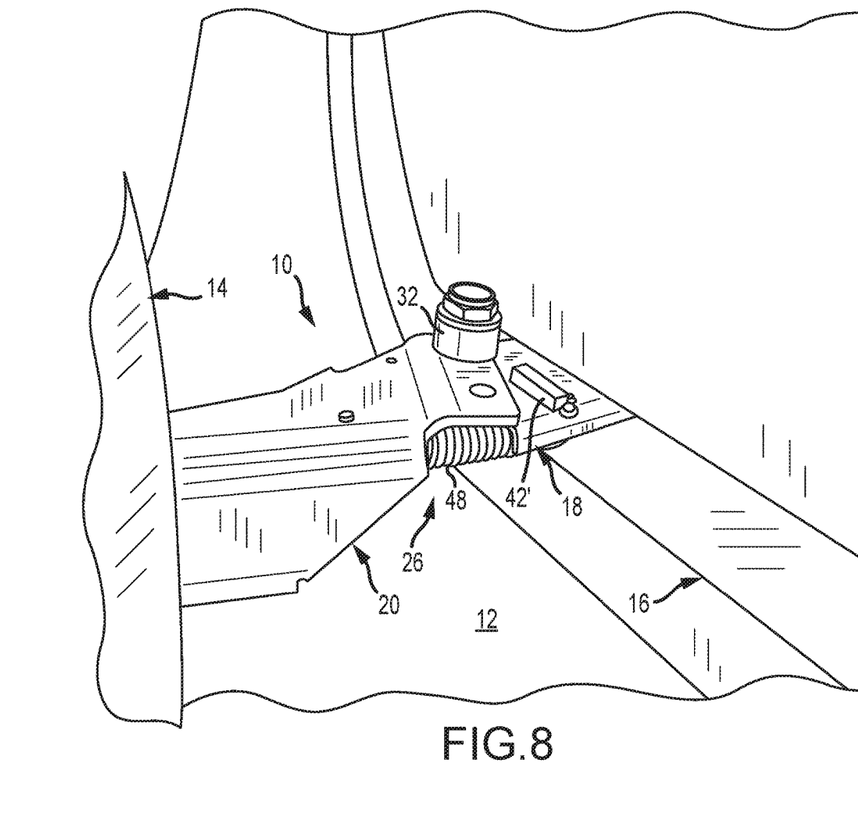
FIG. 8 is perspective view of the extended range sliding door hinge illustrated in FIG. 7 with the door in the fully opened position and the extended range sliding door hinge in the extended position.

With reference now to FIGS. 2 and 6-8, the extended range sliding door hinge 10 operates as follows extend the opening range of the vehicle sliding door assembly 14, i.e., to allow the door assembly 14 to be opened to the extended position 15 that is beyond the normal or standard position 17 possible with the stock door assembly. More specifically, when the door 14 is located between the closed position and the standard position 17, the extended range sliding door hinge 10 will allow the door 14 to operate normally, with the intermediate bracket 20 remaining in the retracted position 24. Biasing member 46 or 46' may help to hold the intermediate bracket 20 in the retracted position 24. This position is illustrated in FIG. 6. However, the door 14 may be further opened, i.e., to the extended position 15, by continuing to move door assembly 14 in the rearward direction. As the door assembly 14 is so moved, the intermediate bracket 20 will begin to rotate with respect to the track bracket assembly 18 (as best seen in FIGS. 7 and 8), thereby allowing the door assembly 14 to move to the extended position 15, beyond the standard position 17. Thereafter, the door assembly 14 may be returned to the closed position in the normal manner. As the door assembly 14 is moved to the closed position, the intermediate bracket 20 will eventually return to the fully retracted position 24 by pivoting with respect to the track bracket assembly 18. Biasing member 46 or 46' assists in returning the intermediate bracket 20 to the fully retracted position 24.

It should be noted that the foregoing description assumes that the lower and upper tracks have been suitably lengthened or otherwise modified to allow the door assembly 14 to move to the extended position 15. Alternatively, it is possible that the existing or OEM track design will permit the extended movement of the door 14 without further modification. In still another alternative, the door assembly 14 may be provided with additional extended range sliding door hinges, but configured to engage the upper and lower sliding door tracks, in order to allow the door assembly 14 to move to the extended position 15.

Figure 9:
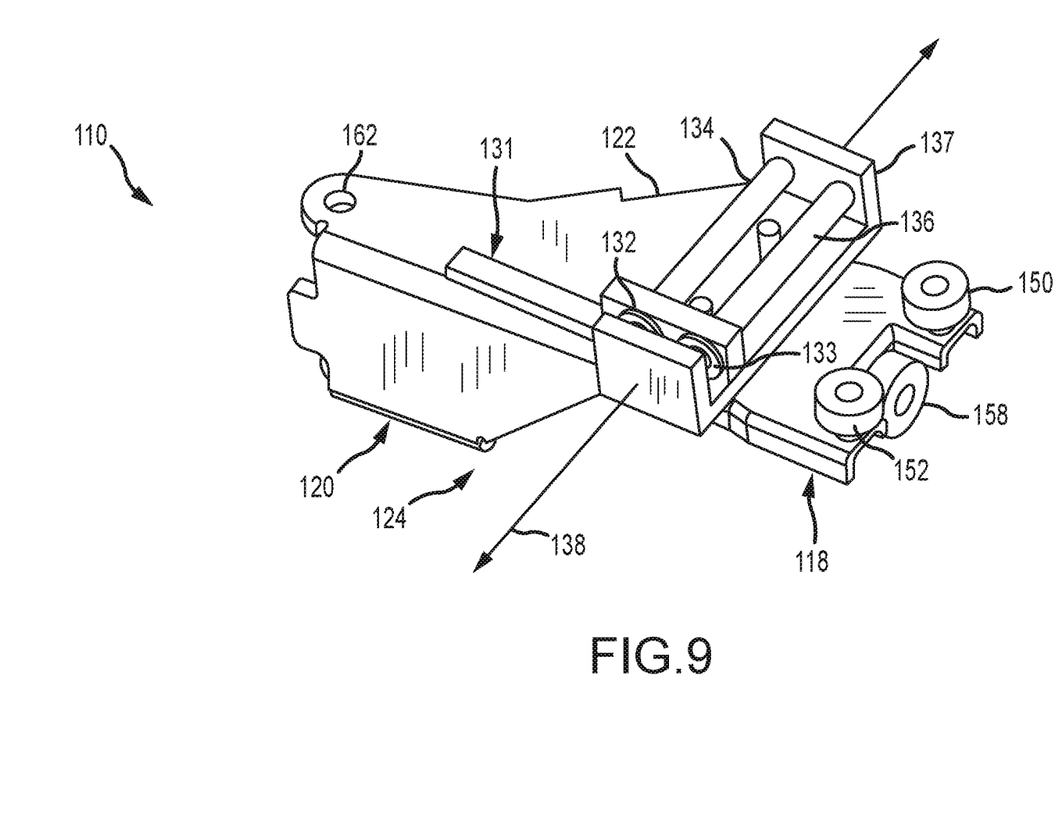
FIG. 9 is a perspective view of a second embodiment of an extended range sliding door hinge with the hinge shown in the retracted position.
Figure 10:
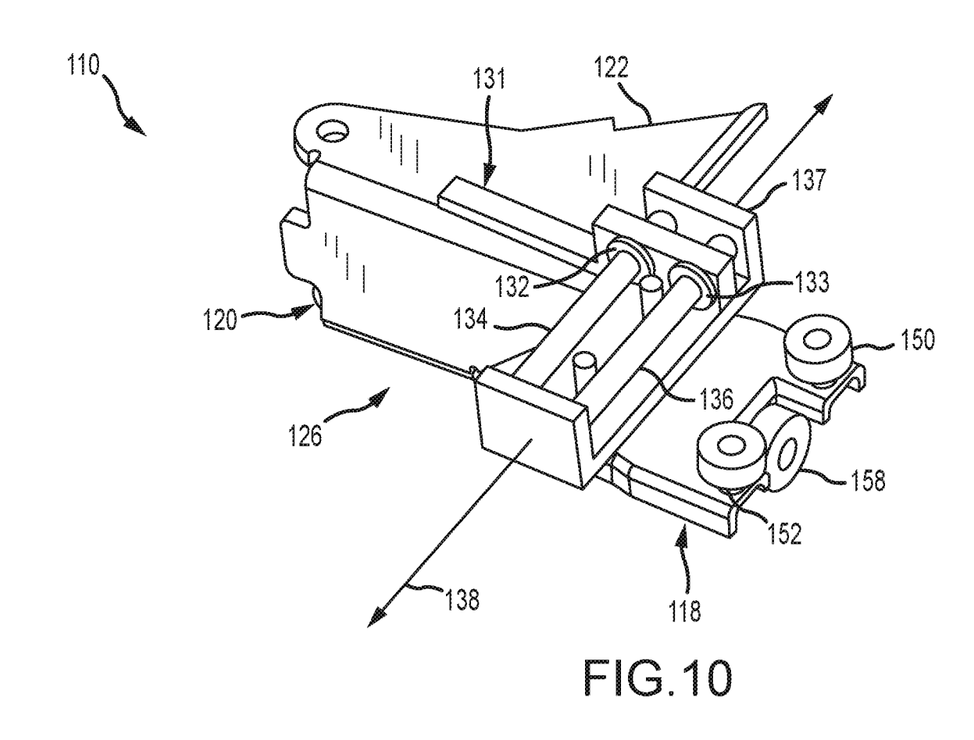
FIG. 10 is a perspective view of the second embodiment of the extended range sliding door hinge with the hinge shown in the extended position.

Other embodiments of the extended range sliding door hinge are possible. For example, and with reference now to FIGS. 9 and 10, a second embodiment 110 of the extended range sliding door hinge is provided with an intermediate bracket 120 that is slidably, rather than pivotally, mounted to the track bracket assembly 118. The slidable mounting arrangement of the second embodiment 110 allows the intermediate bracket 120 to be moved along a longitudinal axis 138 between a retracted position 124 (illustrated in FIG. 9) and an extended position 126 (illustrated in FIG. 10). In the particular embodiment illustrated in FIGS. 9 and 10, the sliding mounting arrangement is achieved by mounting a pair of guide rods 134 and 136 to a guide rod bracket 137. Guide rod bracket 137 may in turn be fixedly mounted to the track bracket assembly 118. A rod follower 131 may be used to secure a first end 122 of intermediate bracket 120 to the guide rods 134 and 136. If desired, rod follower 131 may be provided with a pair of bushings 132 and 133 sized to slidably receive the guide rods 134 and 136. Of course, track bracket assembly 118 may be provided with guide wheels 150, 152, and 158 sized and positioned to engage the middle door track 16 provided on vehicle 12. Similarly, the second end 128 of intermediate bracket 120 may be provided with a pair of holes (only upper hole 162 is shown in FIGS. 9 and 10) sized and spaced to allow the second end 128 of intermediate bracket 120 to be mounted to the door bracket 30 provided on sliding door assembly 14. See FIG. 6.

In operation, the second embodiment 110 of the extended range sliding door hinge also permits the door assembly 14 to open to the extended position 15, i.e., beyond the standard position 17, except that in moving to the extended position 15, the intermediate bracket 120 moves or slides with respect to track bracket assembly 118 (i.e., along longitudinal axis 138), rather than pivoting about axis 38 as in the first embodiment 10.

As mentioned earlier, the extended range sliding door hinge assembly of the present invention may be used to replace one or more of the existing hinges on the sliding door assembly 14 of vehicle 12. A first step may involve removing the sliding door assembly 14 from the vehicle 12. Thereafter, one or more of the existing or OEM sliding door hinges (not shown) may be removed from the sliding door assembly 14 and from the vehicle door track assemblies, e.g., center door track assembly 16. The extended range sliding door hinge (e.g., 10 or 110) as described herein may then be substituted for the original sliding door hinge. In one embodiment this may be accomplished by mounting the extended range sliding door hinge 10 to the vehicle door assembly 14 or to a separate door bracket 30, if provided. The vehicle door assembly 14 may then be reinstalled by engaging the extended range sliding door hinge 10 with the vehicle door track assembly 16. Thereafter, the extended range sliding door hinge will allow the sliding door to be moved between a standard position 17, i.e., when the intermediate bracket 20 of the extended range sliding door hinge 10 is in the retracted position 24 (illustrated in FIGS. 1, 5, and 6) and an extended position 15, i.e., when the intermediate bracket 20 of the extended range sliding door hinge 10 is in the extended position 26 (illustrated in FIGS. 3, 7, and 8).

If the sliding door assembly 14 of vehicle 12 is mounted to vehicle 12 by respective lower, intermediate, and upper door track assemblies, as is the common arrangement, then the extended range sliding door hinge 10 may be engaged with the intermediate vehicle door track assembly 16, as described herein. However, in some embodiments it may be necessary to also extend the lengths of or otherwise modify the upper and lower door track assemblies to accommodate the increased movement provided by the extended range sliding door hinge 10. Alternatively, additional extended range sliding door hinges may be substituted for the existing lower and upper track hinges in order to provide the desired increased movement.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A method of increasing a width of an opening created in a vehicle by a moving a sliding door from a closed position to an opened position, comprising:
    removing the sliding door from the vehicle;
    removing at least one existing sliding door hinge from the sliding door and from a vehicle door track assembly provided on the vehicle;
    providing an extended range sliding door hinge having a track bracket assembly sized to be operatively received by the vehicle door track assembly and an intermediate bracket having a first end and a second end, the first end of the intermediate bracket being movably mounted to the track bracket assembly so that the intermediate bracket may be moved with respect to the track bracket assembly between a retracted position and an extended position, the second end of the intermediate bracket being sized to operatively engage the sliding door; and
    reinstalling the sliding door on the vehicle by engaging the extended range sliding door hinge with the vehicle door track assembly and the sliding door, the extended range sliding door hinge allowing the sliding door to be moved between a standard position when the intermediate bracket of the extended range sliding door hinge is in the retracted position and an extended position when the intermediate bracket of the extended range sliding door hinge is in the extended position.

2. The method of claim 1, wherein the sliding door is movably mounted to the vehicle by respective lower, intermediate, and upper vehicle door track assemblies and wherein said reinstalling comprises engaging the extended range sliding door hinge with the intermediate vehicle door track assembly.

3. The method of claim 2, further comprising extending a length of the lower door track assembly before said reinstalling.

4. The method of claim 2, further comprising extending a length of the upper door track assembly before said reinstalling.

* * * * *